United States Patent
Gurtner et al.

(10) Patent No.: US 10,847,332 B2
(45) Date of Patent: Nov. 24, 2020

(54) CASCADING CONTACTOR DRIVE SYSTEM

(71) Applicant: K2 Energy Solutions, Inc., Henderson, NV (US)

(72) Inventors: David Gurtner, Las Vegas, NV (US); Scott Stewart, Henderson, NV (US); Gilbert De Guzman, Henderson, NV (US)

(73) Assignee: K2 Energy Solutions, Inc., Henderson, NV (US)

( * ) Notice: Subject to any disclaimer, the term of this patent is extended or adjusted under 35 U.S.C. 154(b) by 286 days.

(21) Appl. No.: 16/104,297

(22) Filed: Aug. 17, 2018

(65) Prior Publication Data

US 2019/0057828 A1 Feb. 21, 2019

Related U.S. Application Data

(60) Provisional application No. 62/546,805, filed on Aug. 17, 2017.

(51) Int. Cl.
*H01H 50/54* (2006.01)
*H01H 47/22* (2006.01)
(Continued)

(52) U.S. Cl.
CPC .......... *H01H 47/22* (2013.01); *B60L 3/0046* (2013.01); *B60L 3/0069* (2013.01); *B60L 58/18* (2019.02);
(Continued)

(58) Field of Classification Search
CPC .... H01H 9/0066; H01H 50/541; H01H 47/22; H01H 47/18; H01H 50/44; H01H 50/54
See application file for complete search history.

(56) References Cited

U.S. PATENT DOCUMENTS 5,969,503 A * 10/1999 Davis ............... H02J 13/0003
                                                        320/118
6,599,655 B2 * 7/2003 Johnson .............. B64G 1/425
                                                        320/116
(Continued)

FOREIGN PATENT DOCUMENTS

CN       102029914       7/2013
EP       2 482 367 A2    8/2012
(Continued)

OTHER PUBLICATIONS

PCT Search Report and Written Opinion from corresponding PCT application, PCT/US2018/046880, dated Nov. 6, 2018.

(Continued)

*Primary Examiner* — Harry R Behm
(74) *Attorney, Agent, or Firm* — Stine Law Ltd.

(57) ABSTRACT

A system for sequentially interconnecting battery modules of a battery pack is disclosed. The battery pack may comprise first, second and third battery modules. Each of the first, second and third battery modules includes a first power output terminal and a second power output terminal. Each of the first power output terminals is of a first polarity and the each of the second power output terminals is of a second, opposite polarity. The system comprises a control module for providing a control signal to sequentially interconnect the battery modules, a first interconnect controller electrically disposed between the first and second battery modules, and a second interconnect controller electrically disposed between the second and third battery modules. Each of the first and second interconnect controllers includes a contactor comprising a main contact, an auxiliary contact and an actuating coil for closing the respective main contact and auxiliary contact. The actuating coil of the first interconnect controller responds to the control signal to close the respective main contact, coupling the first battery module to the (Continued)

second battery module, and to close the respective auxiliary contact to pass the control signal to the second interconnect controller. The actuating coil of the second interconnect controller responds to the passed control signal from the first interconnect controller to close the respective main contact of the second interconnect controller, coupling the third battery module to the previously connected first and second battery modules.

20 Claims, 8 Drawing Sheets (51) Int. Cl.
<table>
<tr><td>B60L 58/18</td><td>(2019.01)</td></tr>
<tr><td>B60L 3/00</td><td>(2019.01)</td></tr>
<tr><td>H01H 9/00</td><td>(2006.01)</td></tr>
<tr><td>H02J 7/00</td><td>(2006.01)</td></tr>
<tr><td>H01H 47/18</td><td>(2006.01)</td></tr>
<tr><td>H01H 50/08</td><td>(2006.01)</td></tr>
<tr><td>H01H 50/44</td><td>(2006.01)</td></tr>
<tr><td>B60L 3/04</td><td>(2006.01)</td></tr>
</table>

(52) U.S. Cl.
CPC .......... *H01H 9/0066* (2013.01); *H01H 47/18* (2013.01); *H01H 50/08* (2013.01); *H01H 50/44* (2013.01); *H01H 50/541* (2013.01); *H02J 7/0031* (2013.01); *B60L 3/04* (2013.01)

(56) References Cited

U.S. PATENT DOCUMENTS

<table>
<tr><td>10,014,697 B2 *</td><td>7/2018</td><td>Maltsev</td><td>H02J 7/0016</td></tr>
<tr><td>2011/0140529 A1 *</td><td>6/2011</td><td>Svensson</td><td>H01M 10/425<br>307/77</td></tr>
<tr><td>2016/0233720 A1 *</td><td>8/2016</td><td>Lee</td><td>G06F 1/28</td></tr>
</table>

FOREIGN PATENT DOCUMENTS

<table>
<tr><td>EP</td><td>2 482 367 A3</td><td>10/2012</td></tr>
<tr><td>PL</td><td>401580</td><td>5/2014</td></tr>
<tr><td>PL</td><td>229845</td><td>8/2018</td></tr>
</table>

OTHER PUBLICATIONS

PCT Written Opinion/International Preliminary Report on Patentability, from corresponding PCT application, PCT/US2018/046880, dated Feb. 27, 2020.

* cited by examiner

CASCADING CONTACTOR DRIVE SYSTEM

BACKGROUND

In order to make large battery pack systems safer, they can be physically broken up into modules which may each have a maximum voltage of 60 V or less. Working on such isolated modules does not pose a significant electrocution risk to an operator compared to a large pack, such as a 576 volt DC vehicle charger. In order to connect the modules in series for operation, some kind of mechanical switch is required between each module. While physical switches may be used, this is not very practical since it requires going to each module and manually operating the switch; further, this reduces the safety factor somewhat because the user is in proximity to the switch.

A safer and more convenient method is to put an electromechanical switch, such as a contactor, between each module, and turning them all on remotely using a low-power control signal from the control module. However, simultaneously driving several contactors requires significant initial current—a Tyco EV200, for example, only needs about 200 mA to stay closed, but it might take 2.5 A initial drive current to turn on. So for a 17-contactor system, initial current could be as much as 42.5 A. This may be more than a simple control system is designed to drive.

One solution may be to separate each drive line, such that only 2.5 A is needed by each line. However this may require sixteen additional control lines, which may result in a significantly more complex controller and wiring harness to all of the isolation contactors.

SUMMARY

In accordance with one aspect of the present invention, a single control line may be used to drive a first contactor, and then the first contactor, after it has closed, may be used to drive the next contactor, and so on, until the entire battery system is engaged.

These and other objectives and advantages of the present invention will become apparent from the following description taken in conjunction with the accompanying drawings wherein are set forth, by way of illustration and example, certain embodiments of the invention.

DESCRIPTION OF THE FIGURES

FIG. 2 is a schematic representation of one embodiment of an interconnect circuit which may be utilized in the cascading contactor drive system of FIG. 1; and.

DESCRIPTION OF THE PREFERRED EMBODIMENTS

While this invention is susceptible of embodiment in many different forms, there will be described herein in detail, specific embodiments thereof with the understanding that the present disclosure is to be considered exemplifications of the principles of the invention and is not intended to limit the invention to the specific embodiments illustrated.

Various methods of creating this cascading effect are contemplated.

Figure 1:
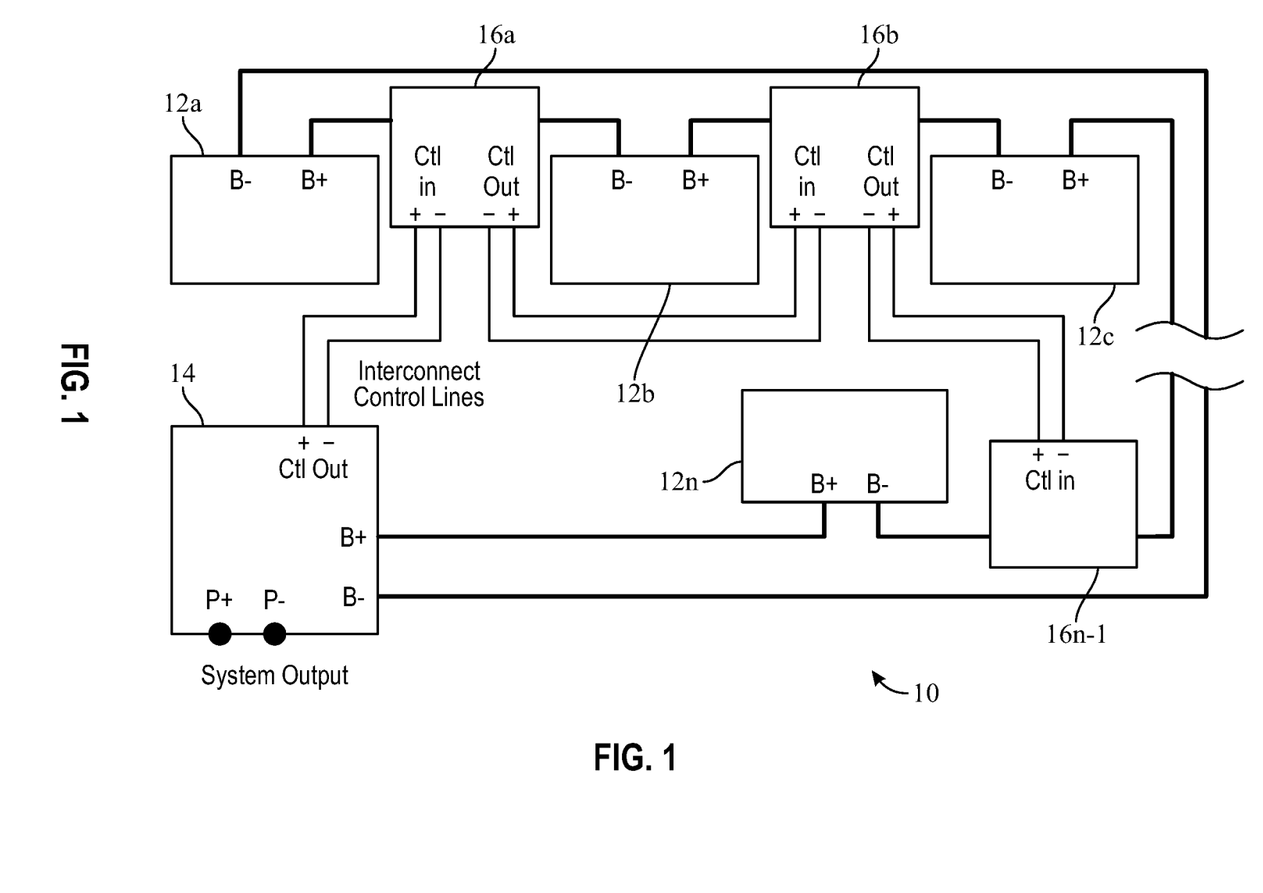
FIG. 1 is a block diagram of a high voltage battery system incorporating a cascading contactor drive system in accordance with the invention.

A high voltage battery system, generally designated 10, is illustrated in FIG. 1. The battery system 10 may include a plurality of battery modules, such as a first battery module 12a, a second battery module 12b, a third battery module 12c, through to an $n^{th}$ battery module 12n (collectively, the battery modules 12). The battery modules 12 may each have a nominal voltage of thirty-two (32) volts DC, and the battery modules 12 may be coupled in series. Each of the battery modules may have conventional positive and negative power terminals B+ and B−, respectively.

The battery control system 10 may include a control module 14. The battery system 10 may further include a plurality of interconnect controllers (collectively the interconnect controllers 16), such as a first interconnect controller 16a, a second interconnect controller 16b, through to an n−$1^{th}$ interconnect controller 16(n−1), respectively disposed between the "n" battery modules 12. The control module 14 may include power output terminals (P+, P−) which may provide system output DC power in a conventional manner, such as to a load (not shown). If the battery modules 12 each have a power output of thirty-two (32) volts DC, the power provided at the power output terminals P+, P−, would be thirty-two (32) times "n," where "n" equals the number of battery modules 12 coupled thereto in series.

Figure 2:
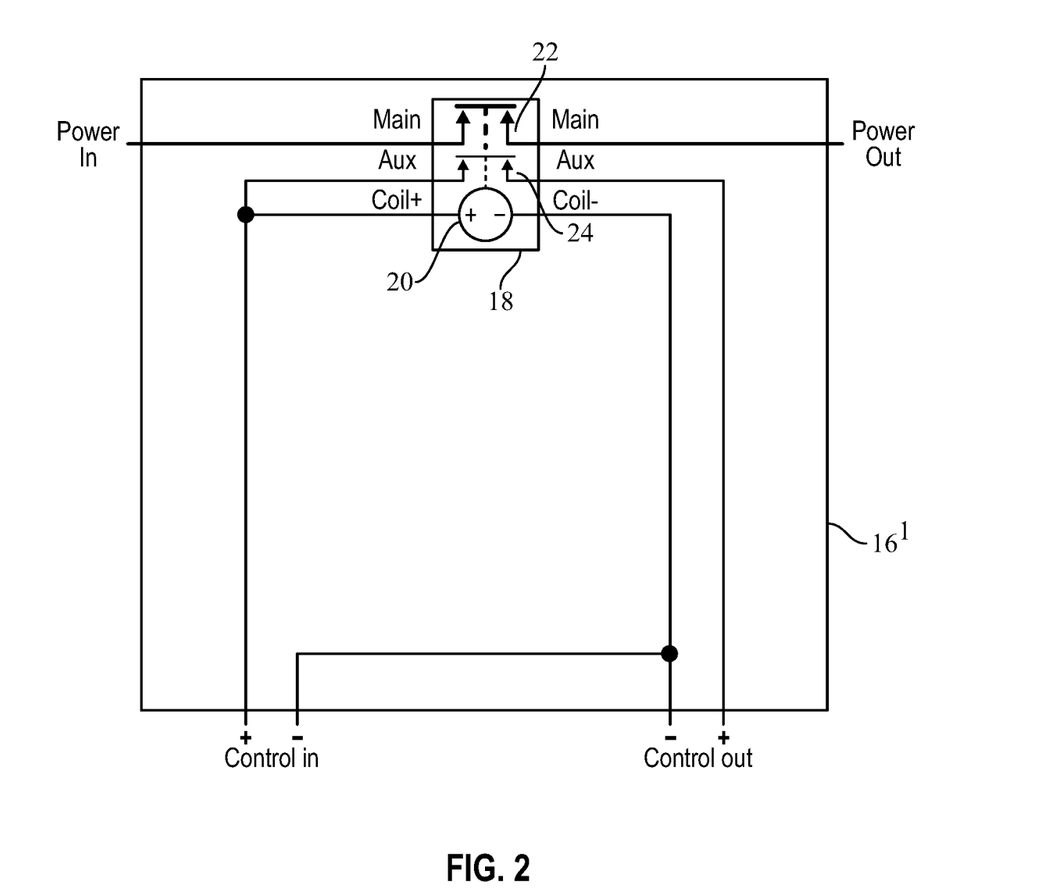

A first embodiment of an interconnect controller $16^1$ is illustrated in FIG. 2. The interconnect controller $16^1$ may be disposed between two of the battery modules 12. As illustrated in FIG. 2, the interconnect controller $16^1$ may include an electromagnetic switch, or contactor, 18 having an actuating coil 20, a main contact 22 and an auxiliary contact 24. The main contact 22 may be electrically coupled between the power output of one of the battery modules 12 and the power input of another, serially coupled, one of the battery modules 12.

In the case of the first interconnect controller 16a of FIG. 1, the auxiliary contact 24 may have an input coupled to a control output of the control module 14, and an output coupled to a control input of the serially, downstream interconnect controller 16b. In the case of the second interconnect controller 16b of FIG. 1, and other ones of the serially subsequent interconnect controllers 16, the auxiliary contact 24 may have a control input coupled to a control output of a preceding interconnect controller 16, and a control output coupled to a control input of a serially downstream interconnect controller 16.

As discussed below, the control signal generated by the control module 14 may be serially passed through the serially connected interconnect controllers 16, as the respective ones of the auxiliary contacts 24 sequentially close.

Specifically, the control module 14 (FIG. 1) may provide, upon command, an initial drive, or control, signal from its control out (Ctl Out) output. The voltage/current magnitude of the drive signal may be dependent upon requirements of the particular contactor utilized.

Still referring to FIG. 2, the first interconnect controller $16^1$ may respond to the initial drive signal to energize the coil 20 of the contactor 18. As is known, energization of the coil 20 by the initial drive signal may close both the main contact 22 and the auxiliary contact 24. Closure of the main contact 22 may couple the power output of the preceding battery module 12 to the serially subsequent battery module 12. Then after the interconnect controller $16^1$ senses that the contactor 18 is closed, via closure of the auxiliary contactor 24, the interconnect controller $16^1$ may send the control signal to the next one of the interconnect controllers $16^1$, and so on. In this way the energy necessary to close a first one of the contactors 18 is already expended before the next one of the contactors 18 is driven, so the current demand to close subsequent ones of the contactors 18 remains an amount relatively equivalent to the amount required to drive a single contactor.

Figure 3:
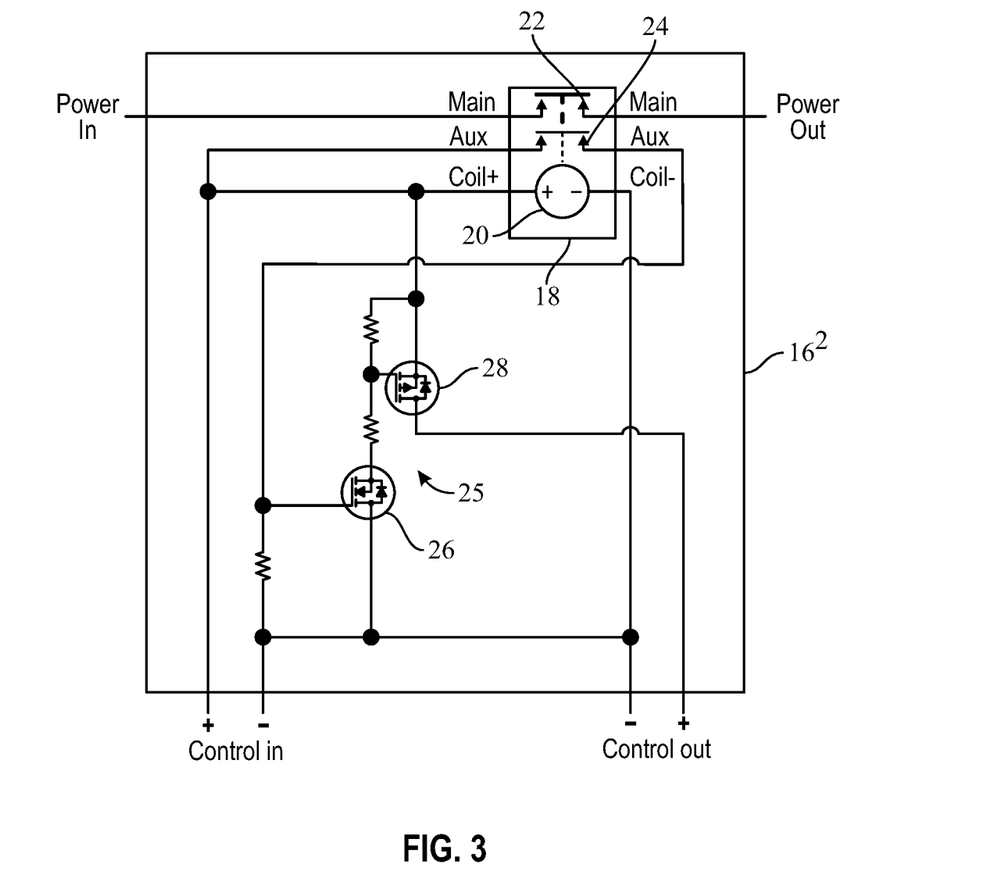
FIG. 3 is a schematic representation of another embodiment of an interconnect circuit, incorporating a driver circuit, which may be utilized in the cascading contactor drive system of FIG. 1.

A second embodiment of an interconnect controller $16^2$ is illustrated in FIG. 3. The second embodiment of the interconnect controller $16^2$ may include a driver circuit, generally designated 25, including first and second, conventionally biased MOSFET transistors 26, 28. The driver circuit 25 may provide a relatively inexpensive way to simplify a battery module isolation system on a high voltage battery. According to the second embodiment of the interconnect controller $16^2$, the Control In signal closes the main contactor 22 and the auxiliary contactor 24. The Control In signal passes through the auxiliary contactor 24 to the driver circuit 25, which then passes out to the Control Out lines, to the serially next one of the interconnect controllers 16.

Figure 4A:
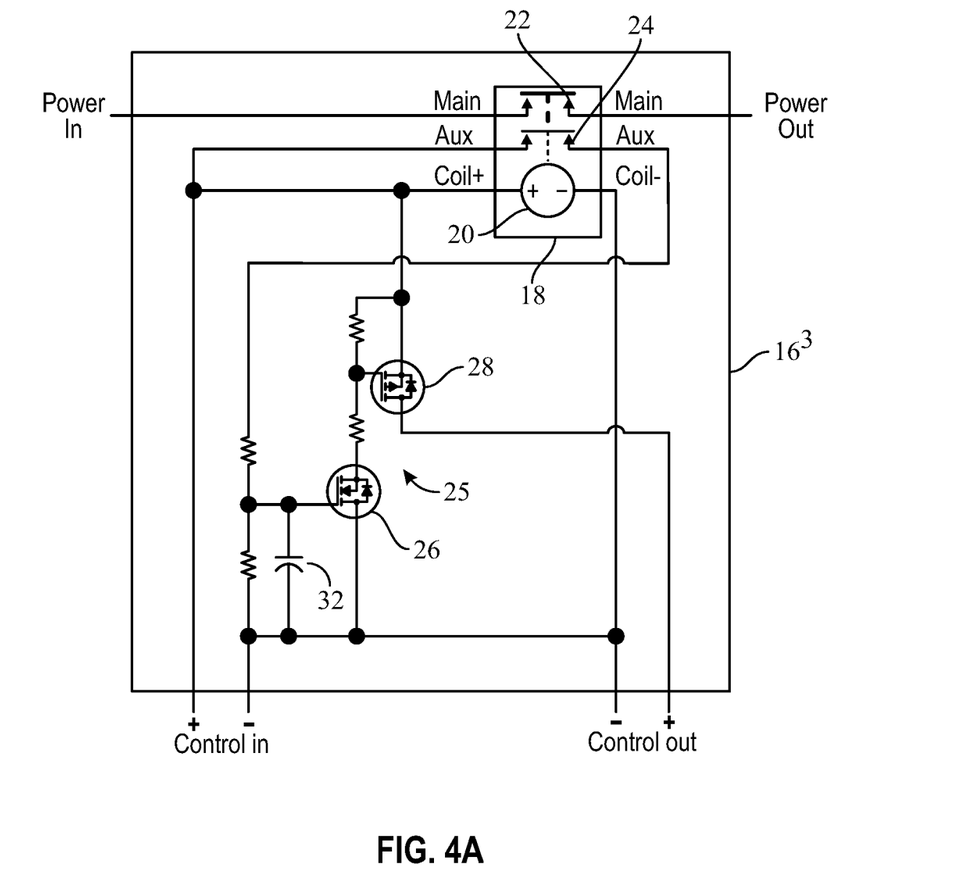
FIG. 4a is a schematic representation of another embodiment of an interconnect circuit, adding one embodiment of a delay circuit to the driver circuit of FIG. 3.

A third embodiment of an interconnect controller $16^3$ is illustrated in FIG. 4a. According to the third embodiment of an interconnect controller $16^3$, a capacitor 32 may be added to the driver circuit 25, to add a delay to the driver circuit 25 passing the Control In signal to the serially next interconnect controller 16.

Figure 4B:
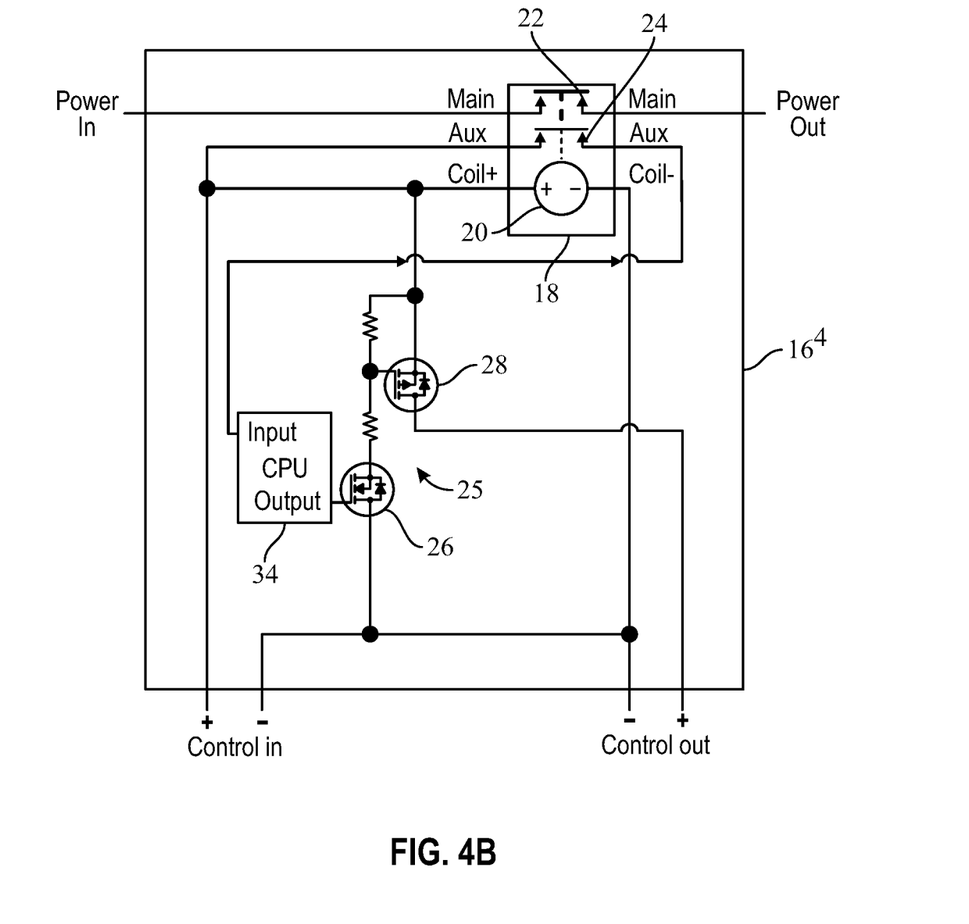
FIG. 4b is a schematic representation of another embodiment of an interconnect circuit, adding another embodiment of a delay circuit to the driver circuit of FIG. 3.

A fourth embodiment of an interconnect controller $16^4$ is illustrated in FIG. 4b. According to the fourth embodiment of the interconnect controller $16^4$, a microprocessor 34 may be added to the driver circuit 25 to add a programmable delay to the driver circuit 25 passing the Control In signal to the serially next interconnect controller 16.

Figure 5:
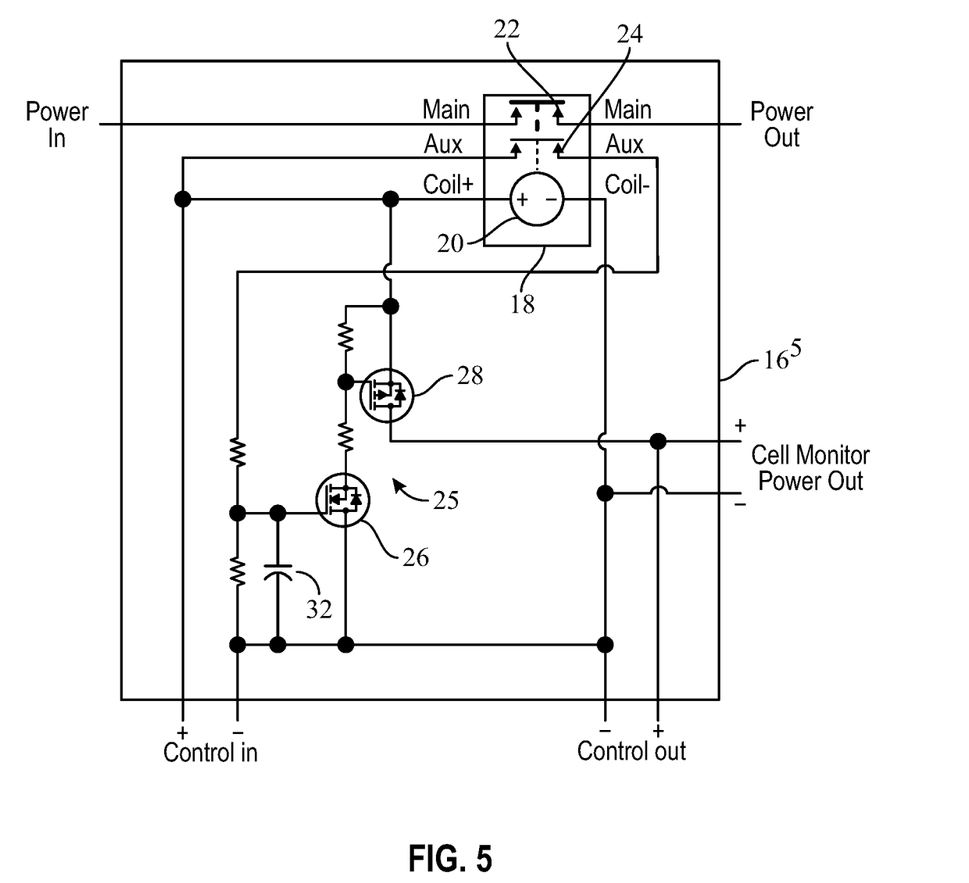
FIG. 5 is a schematic representation of an interconnect circuit including a contactor driver, delay and power out.

A fifth embodiment of an interconnect controller $16^5$ is illustrated in FIG. 5. According to the fifth embodiment of the interconnect controller $16^5$, Power Out lines may be provided, such as coupled to an output of the driver circuit 25, such as to run a cell monitor for that stage.

Figure 6:
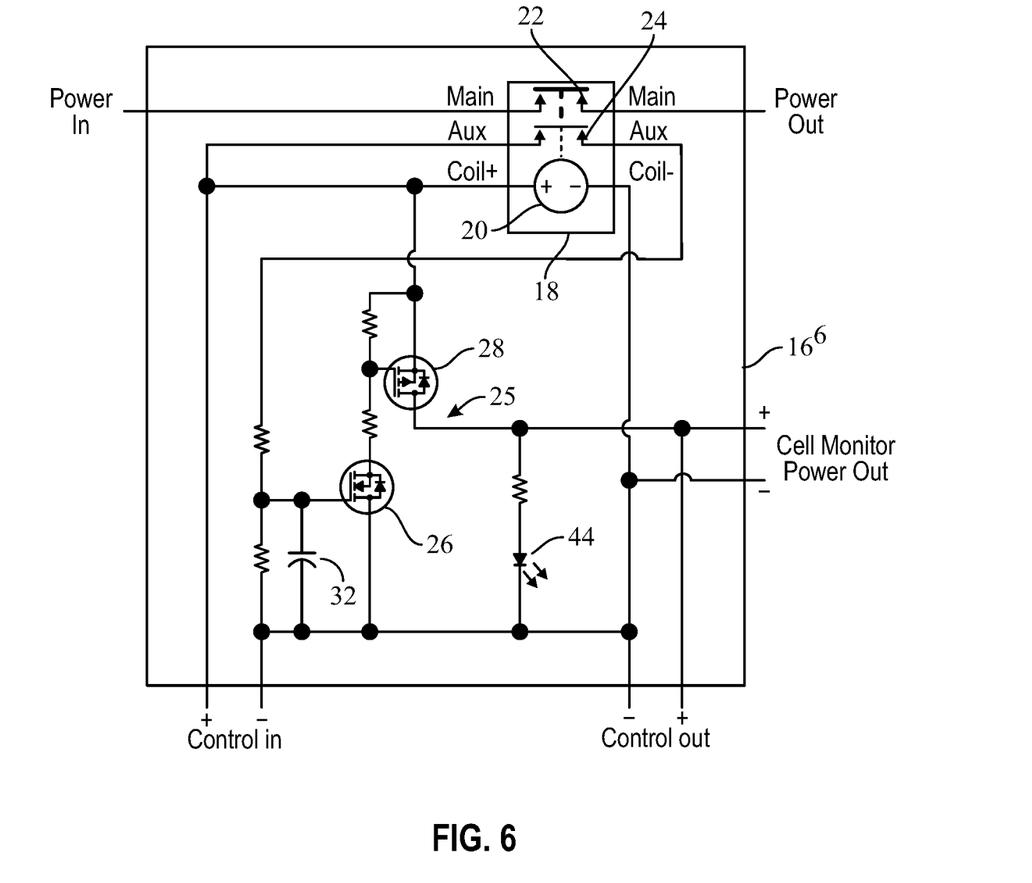
FIG. 6 is a schematic representation of an interconnect circuit including a contactor driver, delay, power out and LED.

A sixth embodiment of an interconnect controller $16^6$ is illustrated in FIG. 6. According to the sixth embodiment of the interconnect controller $16^6$, an LED 44 may be provided at the output of the driver circuit 25 to visually indicate engagement of the contactor 18.

Figure 7:
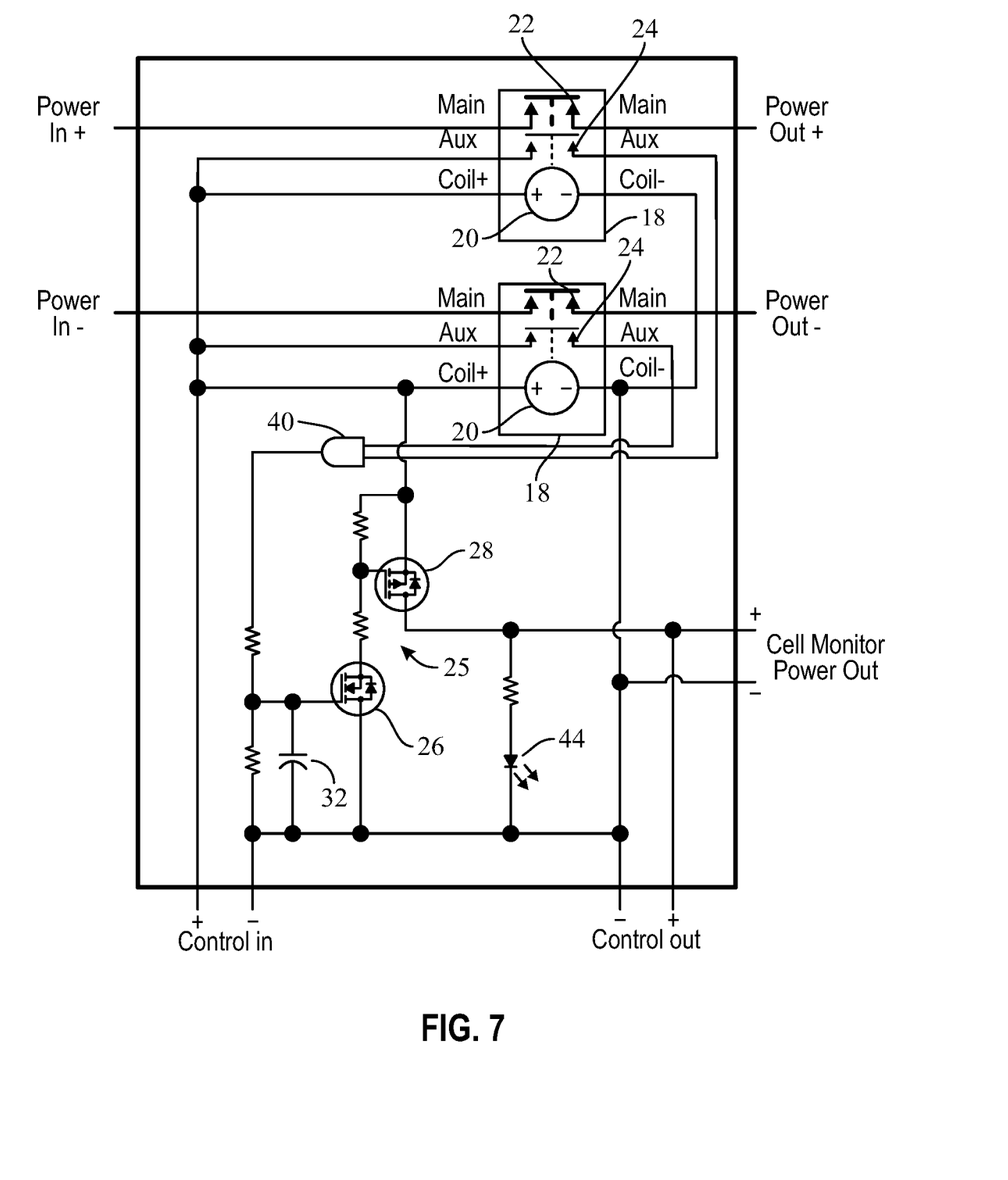
FIG. 7 is a block diagram of a high voltage battery system incorporating a dual interconnect cascading contactor drive system in accordance with the invention

Referring to FIG. 7, a contactor 18 may be provided on both the positive and negative power terminals of each of the interconnect controllers 16, further isolating each of the battery modules 12 where such isolation may be desired or otherwise required, such as for human safety. As illustrated in FIG. 7, the auxiliary outputs of associated contactors 18 may first be input to an AND gate 40, prior to input to the associated driver circuit 25.

It is to be understood that this disclosure is not intended to limit the invention to any particular form described, but to the contrary, the invention is intended to include all modifications, alternatives and equivalents falling within the spirit and scope of the invention.

We claim:

1. A system for providing DC power to a load, the system comprising:

first, second and third battery modules, wherein each of the first, second and third battery modules includes a first power output terminal and a second power output terminal, each of the first power output terminals being of a first polarity and the each of the second power output terminals being of a second, opposite polarity;

a control module having a control module output for providing a control signal;

a first interconnect controller electrically disposed between the first and second battery modules, the first interconnect controller including a first control input and a first control output, a first actuating coil having a first coil input and a first coil output, a first main contact having a first main contact input and a first main contact output, and a first auxiliary contact having a first auxiliary contact input and a first auxiliary contact output, wherein the first control input is coupled to the control module output to operably receive the control signal, the first coil input is coupled to the first control input, the first main contact input is coupled to the first power output terminal of the first battery module and the first main contact output is coupled to the second power output terminal of the second battery module, and the first auxiliary contact input is coupled to the first control input, and the first auxiliary contact output is coupled to first control output;

a second interconnect controller electrically disposed between the second and third battery modules, the second interconnect controller including a second control input, a second actuating coil having a second coil input, and a second main contact having a second main contact input and a second main contact output, wherein the second control input is coupled to the first control output, the second main contact input is coupled to the first power output terminal of the second battery module and the second main contact output is coupled to the second power output terminal of the third battery module;

wherein actuation of the control signal energizes the first actuating coil, closing the first main contact to couple the first battery module to the second battery module, and closing the first auxiliary contact to pass the control signal to the second control input, energizing the second actuating coil, closing the second main contact to couple the third battery module to the first and second battery modules.

2. The system of claim 1, wherein the first polarity is positive.

3. The system of claim 1, including a driver circuit coupled between the first auxiliary contact output and the first control output for isolating the battery modules from the control signal.

4. The system of claim 3, wherein the driver circuit includes means for delaying the control signal passing to the first control output.

5. The system of claim 4, including an output from the driver circuit for monitoring a cell stage.

6. The system of claim 4, including an LED coupled to the driver circuit for indicating engagement of the contactor.

7. The system of claim 3, wherein the driver circuit comprises MOSFET transistors.

8. The system of claim 7, wherein the driver circuit includes a capacitor for delaying the control signal passing to the first control output.

9. The system of claim 7, wherein the driver circuit includes a microprocessor for delaying the control signal passing to the first control output.

10. The system of claim 1, including a second set of interconnect controllers for interconnecting the other set of power out terminals.

11. For a battery pack system comprising first, second and third battery modules, wherein each of the first, second and third battery modules includes a first power output terminal and a second power output terminal, each of the first power output terminals being of a first polarity and the each of the second power output terminals being of a second, opposite polarity, a system for sequentially interconnecting the battery modules comprising:

a control module for providing a control signal to sequentially interconnect the battery modules;

a first interconnect controller electrically disposed between the first and second battery modules;

a second interconnect controller electrically disposed between the second and third battery modules;

wherein each of the first and second interconnect controllers include a contactor comprising a main contact, an auxiliary contact and an actuating coil for closing the respective main contact and auxiliary contact, wherein the actuating coil of the first interconnect controller responds to the control signal to close the respective main contact, coupling the first battery module to the second battery module, and to close the respective auxiliary contact to pass the control signal to the second interconnect controller, and wherein the actuating coil of the second interconnect controller responds to the passed control signal from the first interconnect controller to close the respective main contact of the second interconnect controller, coupling the third battery module to the previously connected first and second battery modules.

12. The system of claim 11, including a third interconnect controller, and wherein the actuating coil of the second interconnect controller responds to the passed control signal to close the respective auxiliary contact of the second interconnect controller to pass the control signal to the third interconnect controller.

13. The system of claim 11, wherein the first interconnect controller includes a driver circuit for isolating the battery modules from the control signal.

14. The system of claim 13, wherein the driver circuit includes means for delaying the passing of the control signal.

15. The system of claim 13, wherein the driver circuit comprises MOSFET transistors.

16. The system of claim 15, wherein the driver circuit includes a capacitor for delaying the control signal passing to the first control output.

17. The system of claim 15, wherein the driver circuit includes a microprocessor for delaying the control signal passing to the first control output.

18. The system of claim 13, including an output from the driver circuit for monitoring a cell stage.

19. The system of claim 13, including an LED coupled to the driver circuit for indicating engagement of the contactor.

20. The system of claim 11, including a second set of interconnect controllers for interconnecting the other set of power out terminals.

* * * * *